(12) United States Patent
Nakamura et al.

(10) Patent No.: US 6,809,443 B2
(45) Date of Patent: Oct. 26, 2004

(54) ALTERNATOR FOR AN AUTOMOTIVE VEHICLE

(75) Inventors: Shigenobu Nakamura, Anjo (JP); Kouchi Ihata, Okazaki (JP); Motoki Ito, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/656,217

(22) Filed: Sep. 8, 2003

(65) Prior Publication Data

US 2004/0051409 A1 Mar. 18, 2004

(30) Foreign Application Priority Data

Sep. 13, 2002 (JP) ........................................ 2002-268162

(51) Int. Cl.[7] .............................................. H02K 11/00
(52) U.S. Cl. ..................................... 310/68 D; 310/64
(58) Field of Search ............................. 310/68 D, 64; 363/141, 145

(56) References Cited

U.S. PATENT DOCUMENTS

| 5,682,070 | A | * | 10/1997 | Adachi et al. ................ 310/71 |
| 5,729,063 | A | * | 3/1998 | Adachi et al. ............ 310/68 D |
| 5,828,564 | A | | 10/1998 | Mori et al. |
| 6,184,600 | B1 | * | 2/2001 | Asao et al. .................... 310/64 |
| 6,198,187 | B1 | | 3/2001 | Asao et al. |
| 6,731,030 | B2 | * | 5/2004 | Keidar et al. ............. 310/68 D |
| 6,734,587 | B2 | * | 5/2004 | Hirsou et al. ............. 310/68 D |

FOREIGN PATENT DOCUMENTS

| JP | 10-242671 A | 9/1998 |
| JP | 11-164538 A | 6/1999 |
| JP | 2000-341919 A | 12/2000 |
| JP | 2001-169510 A | 6/2001 |

* cited by examiner

*Primary Examiner*—Thanh Lam
(74) *Attorney, Agent, or Firm*—Oliff & Berridge, PLC

(57) ABSTRACT

A small-diameter fin and a large-diameter fin, each extending in a direction normal to an axial direction of a rotor, are disposed at both sides of a terminal base so as to be overlapped in the axial direction of the rotor. The small-diameter fin is disposed far from the rotor compared with the large-diameter fin. The small-diameter fin is provided with a plurality of independent ribs each protruding in the axial direction of the rotor and extending in a radial direction of the rotor from or along an opening periphery of the receiving hole of the rectifying element.

5 Claims, 4 Drawing Sheets

ALTERNATOR FOR AN AUTOMOTIVE VEHICLE

BACKGROUND OF THE INVENTION

This invention relates to an alternator for an automotive vehicle.

Due to downsizing, weight reduction, and power increase of recent engines, electric devices or accessories installed on the engine are subjected to severe vibrations. Furthermore, for the purpose of reducing an aerodynamic resistance of a traveling vehicle, the vehicle body employs a slant nose shape. Meanwhile, the number of components to be installed in an engine room is increasing recently. Furthermore, from the need of securing a comfortable compartment space, the space available for the engine is becoming smaller. Under such environments, the automotive alternators tend to be subjected to higher ambient temperatures. On the other hand, seeking comfortableness and safety in the vehicle necessarily increases the electric load of various electric devices. The automotive alternators are thus required to generate a large amount of electric power and inevitably generate a great amount of heat. A rectifying device of the alternator includes rectifying elements (e.g., diodes) which have the tendency of being kept at high temperatures. From the reasons described above, the recent automotive alternators are severely required to assure reliable anti-vibration properties and excellent cooling ability.

U.S. Pat. No. 5,828,564 discloses a rectifying element whose metallic base side wall is securely fixed into a receiving recess of a radiator fin. A heat conductive member is interposed between a metallic base bottom of the rectifying element and a receiving recess bottom. This arrangement is advantageous in that no soldering operation is required and accordingly the manufacturing cost can be reduced.

On the other hand, Japanese Patent Application Laid-open No. 11-164538(1999) discloses a rectifying device including a large-diameter fin and a small-diameter fin arranged in an overlapped relationship, according to which the small-diameter fin is disposed closely to a cooling air inlet port and rectifying elements are fixedly driven or implanted in receiving holes of this radiator fin.

When these conventional rectifying devices are subjected to severe vibrations of an automotive vehicle, there is the possibility that any crack may appear and grow from the receiving recess or hole. Furthermore, repetitive thermal stresses applied thereon will loosen the rectifying element out of the receiving recess or hole. This will lead to abnormal power generation from the alternator. Especially, the small-diameter fin of the rectifying device is serious about this problem because the rectifying elements are disposed closely with each other due to a small surface area of the fin. Furthermore, adding the heat conductive member will increase the total number of constituent parts of the alternator and accordingly increase the manufacturing costs.

Furthermore, U.S. Pat. No. 6,198,187 discloses a heat sink with a plurality of fins extending in radial directions.

However, according to this prior art, each rectifying element is fixed to the fin by soldering. If this conventional rectifying device is used under recent high-temperature environments of the automotive vehicle, the soldered portion may melt or thermally fatigue. In this case, replacing the soldering by the above-described engagement is difficult because forming or opening the receiving recesses or holes will sacrifice many of fins extending in radial directions.

Furthermore, a larger-diameter heat sink having no radial fins has a smaller radiation area compared with the small-diameter heat sink. Rectifying elements are required to possess excellent heat durability. The cost will increase. In this case, it may be possible to let the large-diameter fin serve as a frame (i.e., integrate the large-diameter fin with the frame), so as to substantially increase the radiation area. However, in this case, lead portions of each rectifying device need to be welded after the rectifying device is installed in the frame. In other words, wiring connection cannot be accomplished by the rectifying device alone before the rectifying device is assembled with the frame. In general, the frames of alternators are differentiated in the shape of stay for adjustment to various types of engines. Hence, the work of accomplishing a rectifying circuit, when performed after the rectifying device is assembled with the frame, needs to match with the various types of frames. Thus, the manufacturing process will become complicated. The manufacturing costs will increase. In the practical use of automotive alternators, damage or failure of the alternator cannot be fixed by simply replacing the damaged or failed rectifying device with a new one. In other words, a frame integrated with the rectifying device needs to be replaced together. Users will need to absorb the cost of the frame replaced together with the rectifying device.

SUMMARY OF THE INVENTION

In view of the above-described problems, the present invention has an object to provide an alternator for an automotive vehicle which is capable of assuring excellent anti-vibration properties and cooling ability without increasing costs.

In order to accomplish the above and other related objects, the present invention provides an alternator for an automotive vehicle, including a rotor, a stator disposed in an opposed relationship with the rotor, a frame supporting the rotor and the stator, a rectifying device for converting alternating-current output of the stator into direct-current output, and a cooling fan for introducing cooling air from an outside via the rectifying device. The rectifying device, disposed inside the alternator, includes a small-diameter fin and a large-diameter fin having mutually different polarities and each serving as a cooling member as well as an electric conductive member for a plurality of rectifying elements fixed in receiving holes of respective fins, and a terminal base forming a rectifying circuit of the rectifying elements. The small-diameter fin and the large-diameter fin, each extending in a direction normal to an axial direction of the rotor, are disposed at both sides of the terminal base so as to be overlapped in the axial direction of the rotor. The small-diameter fin is disposed far from the rotor compared with the large-diameter fin. And, the small-diameter fin is provided with a plurality of independent ribs each protruding in the axial direction of the rotor and extending in a radial direction of the rotor from or along an opening periphery of the receiving hole of the rectifying element.

With this arrangement, the rigidity of the small-diameter fin can be enhanced specifically in the vicinity of the receiving hole of the rectifying element. This makes it possible to prevent the small-diameter fin from cracking and also prevent the rectifying element from being loosened. The automotive alternator of this invention assures excellent anti-vibration properties as well as excellent heat durability. Furthermore, the ribs are independent from each other and extend in radial directions. When the cooling fan is rotating, the cooling air introduced from the outside can flow smoothly along the rib surfaces with a smaller flow resistance. The cooling ability of the small-diameter fin can be improved. Furthermore, the terminal base, the small-diameter cooling fin, the large-diameter cooling fin, and the rectifying elements can constitute an independent rectifying circuit in the rectifying device. Compared with a conventional alternator including a frame integrated with a large-diameter fin, it becomes possible to simplify the manufacturing process of the alternator. Thus, the manufacturing cost can be reduced. In an event that any damage or failure occurs in the rectifying device, the repair of the alternator can be easily accomplished by replacing the damaged or failed rectifying device with a new one. Thus, the repair or maintenance cost can be decreased.

Preferably, the ribs are configured into wavy shape. With this arrangement, the heat radiation or heat exchange surface of each rig is increased. The cooling ability of the small-diameter fin can be improved. Furthermore, the wavy rib brings the effect of enhancing the rigidity of the small-diameter fin.

Preferably, the small-diameter fin has a plurality of through holes extending in the axial direction of the rotor for allowing the cooling air to pass and flow toward the large-diameter fin positioned closely to the rotor. With this arrangement, the cooling air can be effectively used for cooling both the small-diameter fin and the large-diameter fin.

Preferably, the through holes are provided in the vicinity of bottom portions of the ribs. This is effective to guide the cooling air to flow closely along the rib surface.

Preferably, an axial thickness of the receiving hole of the small-diameter fin is greater than that of another part of the small-diameter fin. The rigidity of the receiving holes of the small-diameter fin can be improved. Cracking of the fin and loosening of the diode can be surely prevented.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
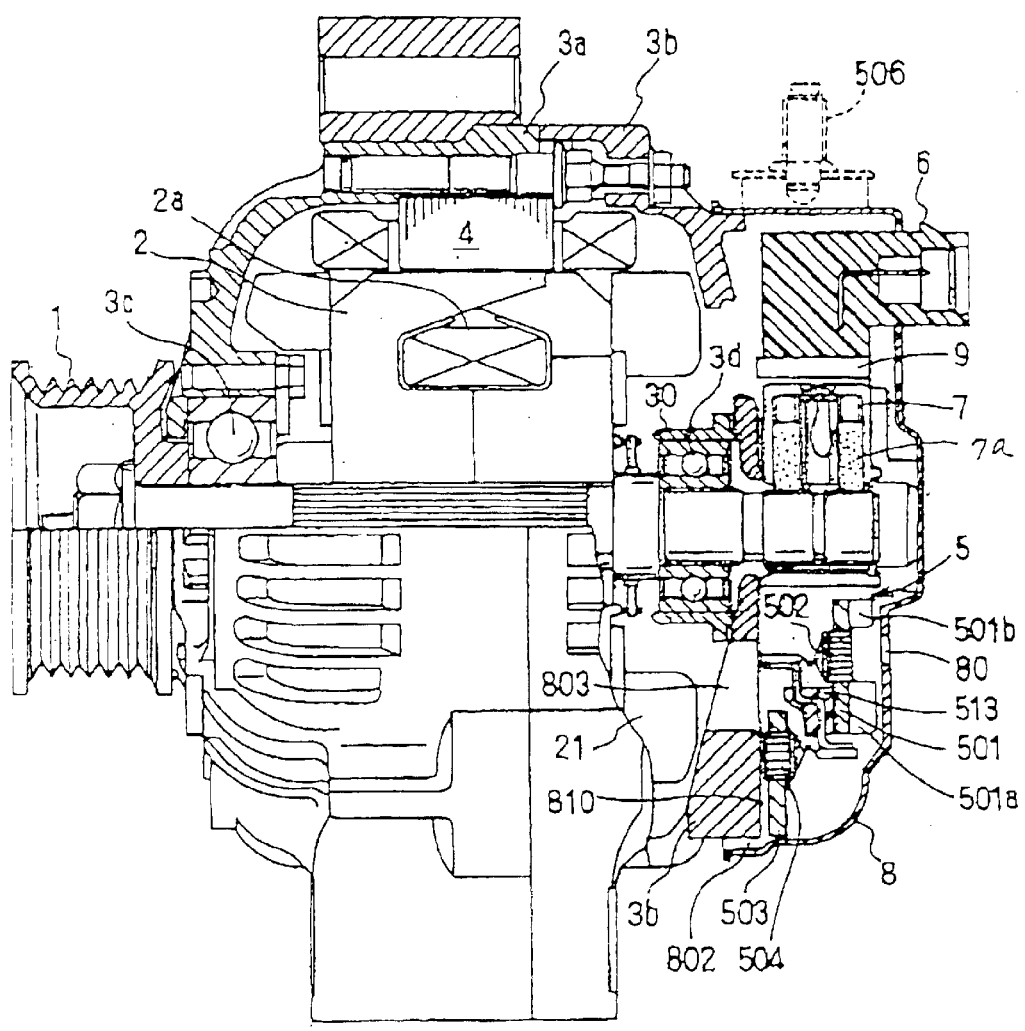
FIG. 1 is a partly cross-sectional view showing an automotive alternator in accordance with a first embodiment of the present invention.

The present invention provides an alternator for an automotive vehicle including a rotor and a stator disposed in an opposed relationship with the rotor. A frame supports the rotor and the stator. A rectifying device converts alternating-current output of the stator into direct-current output. A cooling fan introduces cooling air from an outside via the rectifying device 5. The rectifying device is disposed inside the alternator. The rectifying device includes a small-diameter fin and a large-diameter fin having mutually different polarities and each serving as a cooling member as well as an electric conductive member for a plurality of rectifying elements fixed in receiving holes of respective fins. A terminal base forms a rectifying circuit of the rectifying elements. The small-diameter fin and the large-diameter fin, each extending in a direction normal to an axial direction of the rotor, are disposed at both sides of the terminal base so as to be overlapped in the axial direction of the rotor, and the small-diameter fin is disposed far from the rotor compared with the large-diameter fin. And, the small-diameter fin is provided with a plurality of independent ribs each protruding in the axial direction of the rotor and extending in a radial direction of the rotor from or along an opening periphery of the receiving hole of the rectifying element.

Hereinafter, preferred embodiments of the present invention will be explained hereinafter with reference to attached drawings.

An alternator for an automotive vehicle in accordance with a first embodiment of the present invention will be explained with reference to FIGS. 1 to 4. A pulley 1 is connected to an engine (not shown) via an engine belt (not shown). A rotor 2, connected to the pulley 1, is thus driven by the engine (not shown). A stator 4, serves as an armature, is disposed in an opposed relationship with the rotor 2. A front frame 3a and a rear frame 3b cooperatively support the stator 4 and the rotor 2. The rotor 2 is rotatably supported via a pair of bearings 3c and 3d. A rectifying device 5, connected to the stator 4, converts alternating-current power into direct-current power. Field current is supplied to a field coil 2a of the rotor 2 via a brush 7a held by a brush holder 7. A regulator 9 controls the output voltage. A connector casing 6 has terminals for inputting and outputting electric signals to and from a vehicle control device (not shown). A resin-made protecting cover 8, attached to an end surface of a rear frame 3b, covers the rectifying device 5, the regulator 9 and the brush holder 7. A cooling fan 21 is disposed closely to the rotor 2 compared with the rectifying device 5. Thus, when rotating, the cooling fan 21 introduces fresh air from the outside via the rectifying device 5.

The rectifying device 5 includes a positive-side cooling fin 501, a negative-side cooling fin 503, a predetermined number of positive diodes 502, a predetermined number of negative diodes 504, and a terminal base 513. The positive-side cooling fin 501 is smaller in outer diameter than the negative-side cooling fin 503. In this respect, the positive-side cooling fin 501 corresponds to a small-diameter fin of the present invention. The negative-side cooling fin 503 corresponds to a large-diameter fin of the present invention. Each of the diodes 502 and 504 serves as a rectifying element of the present invention.

Figure 3:
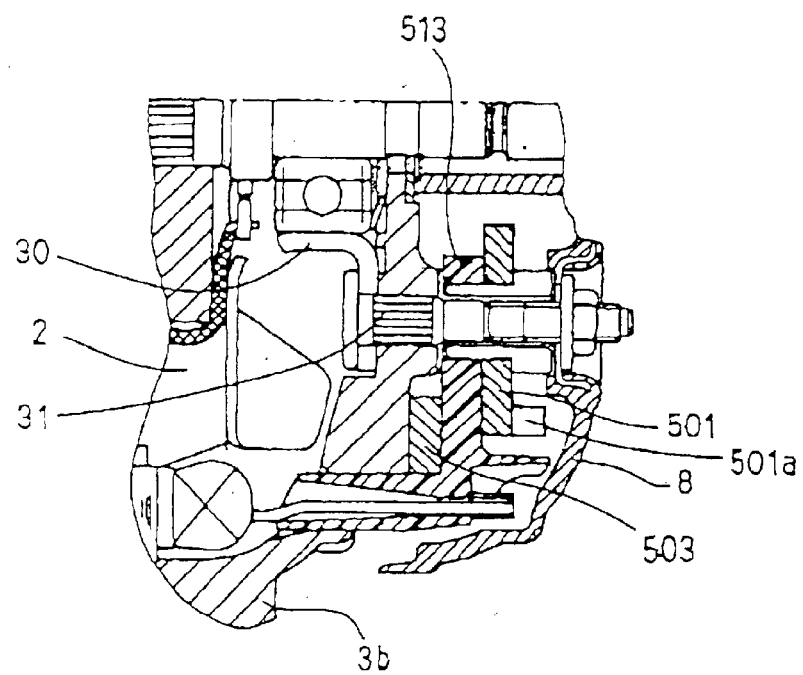
FIG. 3 is an enlarged cross-sectional view showing an essential part of the automotive alternator in accordance with the first embodiment of the present invention.

The positive-side cooling fin 501 and the negative-side cooling fin 503 are disposed at both sides of the terminal base 513 so as to be overlapped in the axial direction. As shown in FIGS. 1 and 3, the terminal base 513 is a resin-made insulating member electrically insulating the cooling fins 501 and 503. Electrically conductive members, embedded in the terminal base 513, supply an alternating-current voltage generated from the stator 2 to the diodes 502 and 504. The diodes 502 and 504 are firmly fixed in receiving holes of the cooling fins 501 and 503 in such a manner that lead terminals of each diode protrude toward respective cooling fins 501 and 503 having opposite polarities. The lead terminals are electrically connected to the electrically conductive members of the terminal base 513.

Figure 2:
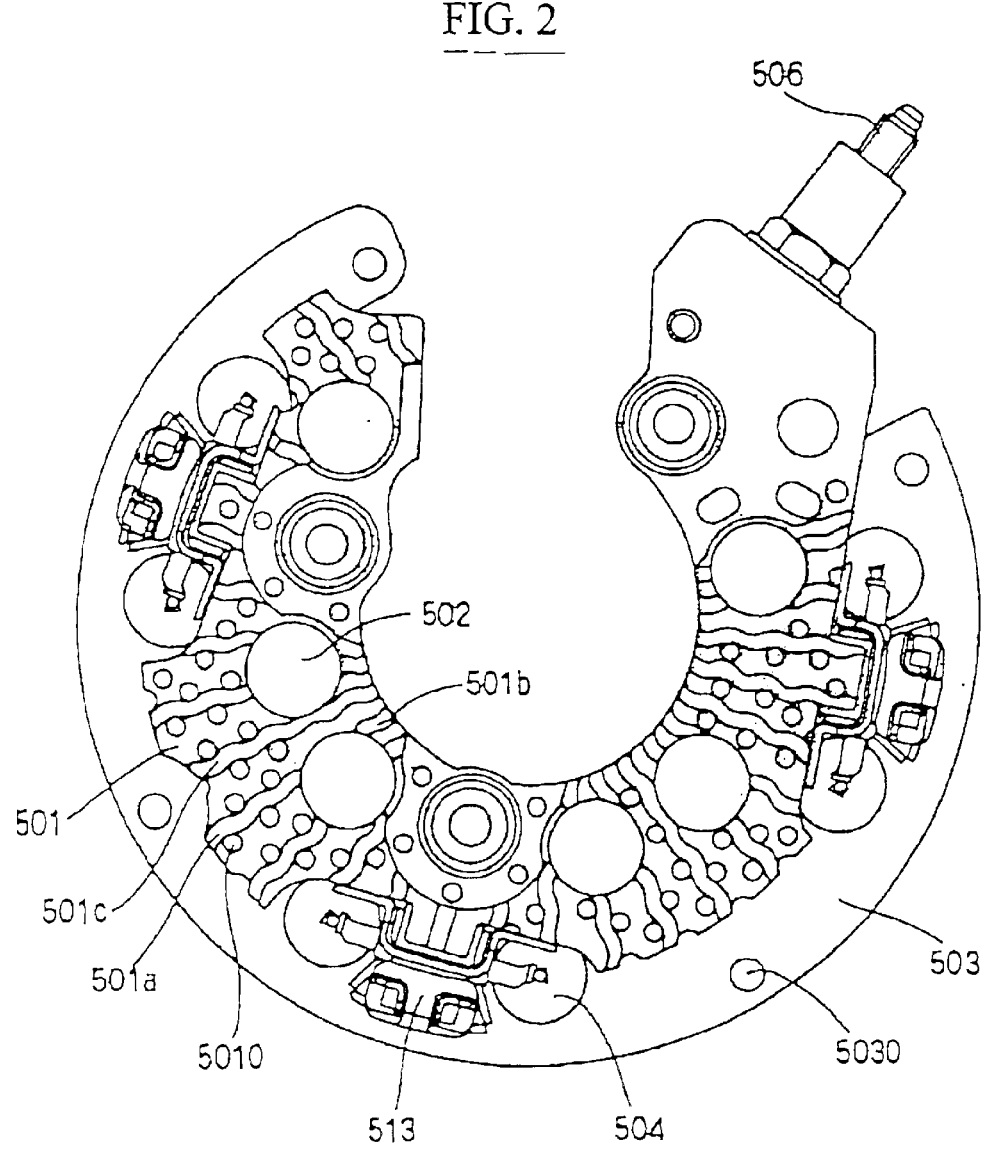
FIG. 2 is a plan view showing a rectifying device incorporated in the automotive alternator in accordance with the first embodiment of the present invention.

Thus, as a whole, these components cooperatively constitute a full-wave rectifying circuit. As shown in FIG. 2, this embodiment discloses a total of six diodes disposed on each cooling fin to form two sets of three-phase full-wave rectifying circuit. The direct-current output is taken out from a bolt 506 attached to the positive-side cooling fin 501. The rectifying device 5 is disposed between the frame 3b and the protecting cover 8, and is tightened together with the protecting cover 8 to an indicating member 31 of a rear bearing box 30.

Figure 4:
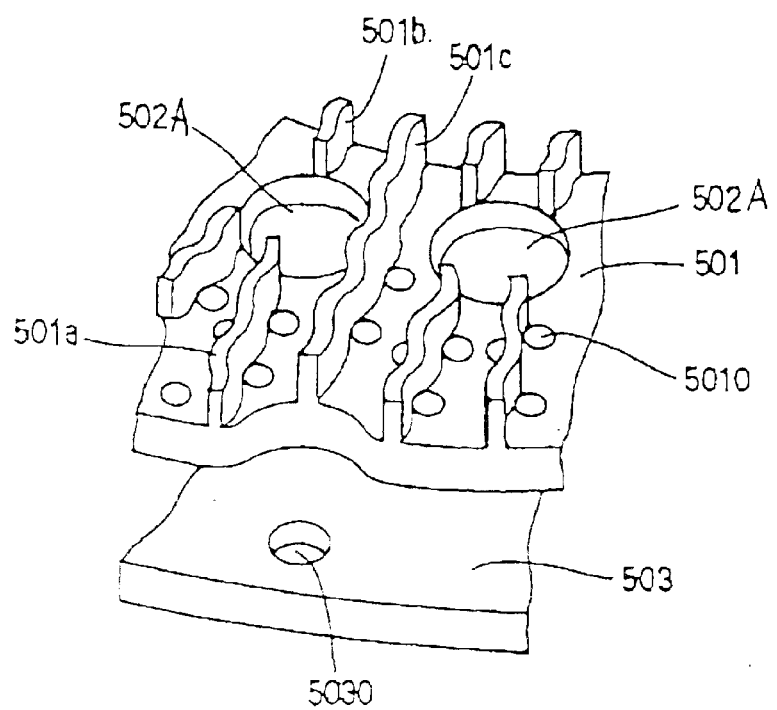
FIG. 4 is a perspective view showing essential members of the automotive alternator in accordance with the first embodiment of the present invention.

As shown in FIG. 4, the positive-side cooling fin 501 has a plurality of ribs 501a and 501b extending in the radial direction from the periphery of each receiving hole 502A of the positive diode 502. Furthermore, an elongated rib 501c extends in the radial direction on the surface of the cooling fin 501. As understood from FIG. 2, the elongated rib 501c is disposed along an opening periphery of the receiving hole 502A. Each of the ribs 501a, 501b, and 501c stands perpendicularly from the surface of the cooling fin 501 and is configured into a wavy shape. An appropriate number of through holes 5010 are opened in the vicinity of the bottom of each rib. Aluminum die casting is preferably used to form these ribs 501a, 501b, and 501c and through holes 5010 in the process of manufacturing the positive-side cooling fin 501. The protecting cover 8 has axial openings 80 each positioned closely to a corresponding positive diode 502. The negative-side cooling fin 503 is a large-diameter fin with four holes 5030 positioned at the radially outer side along its outer periphery. The negative-side cooling fin 503 is tightened to the rear frame 3b by means of screws.

As the positive-side cooling fin 501 is smaller in outer diameter than the negative-side cooling fin 503, respective positive diodes 502 are positioned closely to each other. According to a conventional alternator, there is the possibility that any crack may appear from the opening periphery of each receiving hole 502A and grow along the surface of the cooling fin 501. However, according to the above-described embodiment, the ribs 501a, 501b, and 501c cooperatively reinforce the opening periphery of each receiving hole 502A. As a result, the rigidity of each receiving hole 502A can be enhanced. Thus, it becomes possible to provide a cooling fin free from cracks. Unlike the negative-side cooling fin 503, the positive-side cooling fin 501 is not directly fixed to the rear frame 3b at a plurality portions. As shown in FIG. 3, the positive-side cooling fin 501 is connected to the rear frame 3b via the terminal base 513. The positive-side cooling fin 501 is thus subjected to severe engine vibrations compared with the negative-side cooling fin 503. Furthermore, each fin is subjected to repetitive thermal stresses. Due to these reasons, the diode 502 tends to be loosened and may fall out of its receiving hole 502A. However, providing the ribs 501a, 501b, and 501c of the above-described embodiment brings the effect of improving the rigidity of the positive-side cooling fin 501 and solves the problems of the conventional alternator.

Furthermore, cooling air is introduced from each axial opening 80. The ribs 501a, 501b, and 501c of the positive-side cooling fin 501 guide the cooling air to flow in the radial direction from the axial opening 80. Each rib, provided independently, has low flow resistance against the cooling air flowing in the radial direction. Thus, the cooling air flows smoothly toward an air intake port 803 of the rear frame 3b. The ribs 501a, 501b, and 501c of the cooling fin 501 can also function as radiator fins and accordingly enhance the cooling ability of the positive-side cooling fin 501. Furthermore, the wavy shape of respective ribs 501a, 501b, and 501c increases the surface area of each rib and brings the effect of improving both the cooling ability and the rigidity of the cooling fin 501.

The through holes 5010 provided in the vicinity of the bottom of each rib allow the cooling air to pass. The cooling air, after passing the through holes 5010, contributes to cool the negative-side cooling fin 503 located behind (i.e., at the downstream side) of the positive-side cooling fin 501. As the ribs 501a, 501b, and 501c of the positive-side cooling fin 501 are wavy, it is possible to arrange the through holes 5010 discretely along the surface of the cooling fin 501 as many as possible as shown in FIG. 2 so that no high-temperature portion appears locally.

In addition to the cooling air flowing into the inside of the cover plate 8 from respective axial holes 80, the negative-side cooling fin 503 can be exposed to a fresh air stream coming into an air passage 810 via a radial clearance 802 between the rear frame 3b and the protecting cover 8. Furthermore, the heat of the negative-side cooling fin 503 is smoothly released from the portion directly contacting with the rear frame 3b. From these reasons, the negative-side cooling fin 503 can secure excellent cooling ability.

Furthermore, the terminal base 513, positive-side cooling fin 501, negative-side cooling fin 503, and diodes 502 and 504 can constitute an independent rectifying circuit in the rectifying device 5. Compared with a conventional alternator including a frame integrated with a large-diameter fin, it becomes possible to simplify the manufacturing process of the alternator. Thus, the manufacturing cost can be reduced. In an event that any damage or failure occurs in the rectifying device, the repair of the alternator can be easily accomplished by replacing the damaged or failed rectifying device with a new one. Thus, the repair or maintenance cost can be decreased.

Second Embodiment

Although the above-described first embodiment uses the protecting cover 8, the second embodiment does not require the protecting cover 8.

Figure 5:
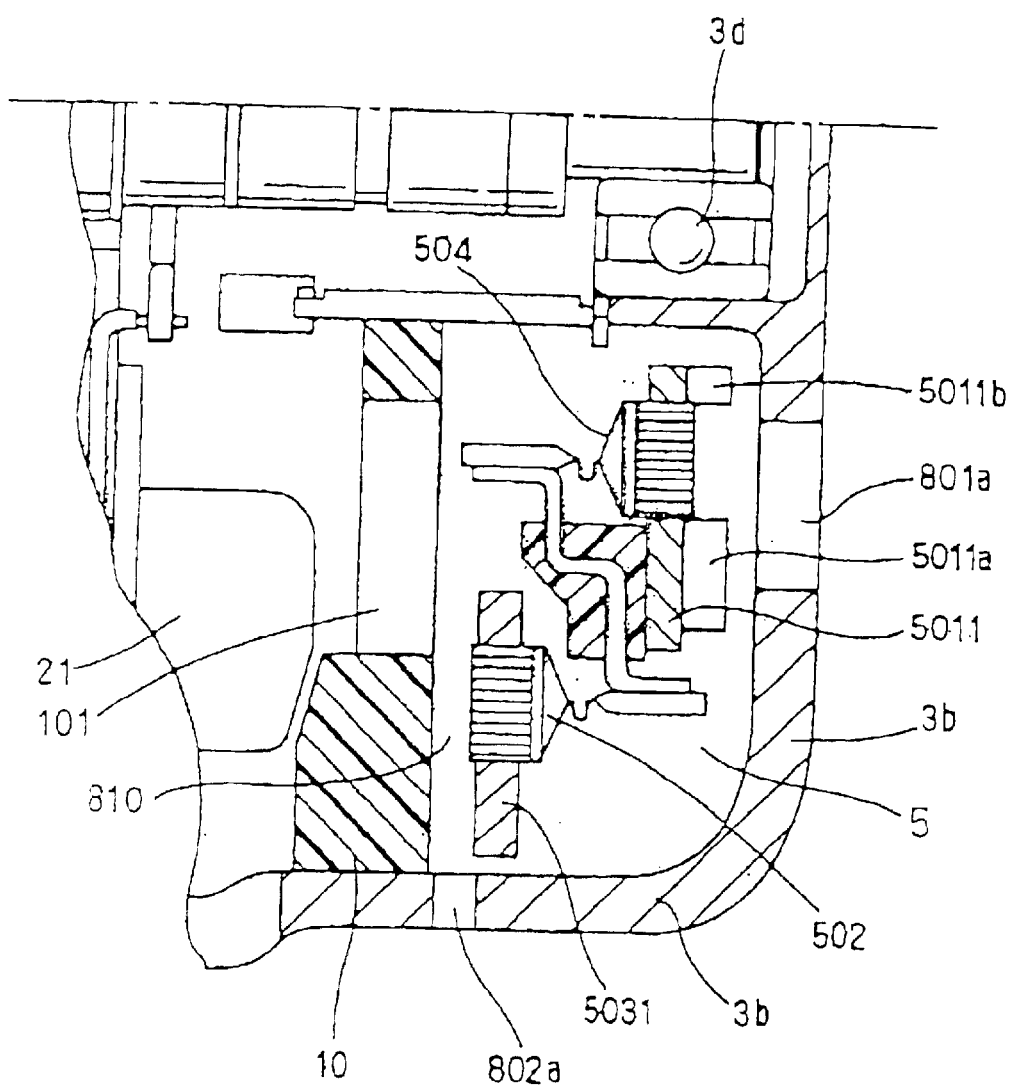
FIG. 5 is an enlarged cross-sectional view showing an essential part of an automotive alternator in accordance with a second embodiment of the present invention.

More specifically, as shown in FIG. 5, a bearing 3d is disposed at the axial end of a rotor shaft and a rectifying device 5 is disposed between a rear frame 3b and a partition plate 10. The rear frame 3b has an air intake window 801a provided at the axial end side as well as an air intake window 802a provided at the radial end side. When the cooling fan 21 is rotating, fresh air is introduced from the intake window 801a and flows in the axial direction or introduced from the intake window 802a and flows in the radial direction. The introduced air cools the rectifying device 5 and smoothly flows toward an air intake port 101 of the partition plate 10. Like the first embodiment, a small-diameter fin 5011 is provided with ribs 5011a and 5011b and through holes. Thus, the second embodiment functions in the same manner and brings substantially the same effects. Furthermore, omitting the protecting cover brings the effect of reducing the total number of constituent parts and simplifying manufacturing processes, thereby reducing the manufacturing costs.

Although a positive diode 502 is disposed on the large-diameter fin 5031 and a negative diode 504 is disposed on the small-diameter fin 5011. It is possible to employ the arrangement shown in the first embodiment.

Other Modifications

It is preferable that an axial thickness of each diode receiving hole of the small-diameter fin is set to be larger than that of another part of the same fin. The rigidity of the diode receiving holes of the small-diameter fin can be improved. Cracking of the fin and loosening of the diode can be surely prevented.

Although the rectifying device of the first embodiment includes two sets of three-phase full-wave rectifying circuit, the present invention can be applied to any other rectifying device having only one set of three-phase full-wave rectifying circuit or three or more sets of three-phase full-wave rectifying circuit. The similar effects will be obtained.

Furthermore, although the first embodiment uses a resin-made protecting cover, it is possible to use a metallic protecting cover which serves as a radiator fin. Using the metallic protecting cover is advantageous in smoothly releasing or radiating the heat from the rectifying device.

Furthermore, each through hole can be configured into any shape.

What is claimed is:

1. An alternator for an automotive vehicle, comprising:
   a rotor;
   a stator disposed in an opposed relationship with said rotor;
   a frame supporting said rotor and said stator;
   a rectifying device for converting alternating-current output of said stator into direct-current output; and
   a cooling fan for introducing cooling air from an outside via said rectifying device,
   wherein said rectifying device is disposed inside said alternator and comprises a small-diameter fin and a large-diameter fin having mutually different polarities and each serving as a cooling member as well as an electric conductive member for a plurality of rectifying elements fixed in receiving holes of respective fins, and a terminal base forming a rectifying circuit of said rectifying elements,
   said small-diameter fin and said large-diameter fin, each extending in a direction normal to an axial direction of said rotor, are disposed at both sides of said terminal base so as to be overlapped in the axial direction of said rotor, and said small-diameter fin is disposed far from said rotor compared with said large-diameter fin, and
   said small-diameter fin is provided with a plurality of independent ribs each protruding in the axial direction of said rotor and extending in a radial direction of said rotor from or along an opening periphery of said receiving hole of said rectifying element.

2. The alternator for an automotive vehicle in accordance with claim 1, wherein said ribs are configured into wavy shape.

3. The alternator for an automotive vehicle in accordance with claim 1, wherein said small-diameter fin has a plurality of through holes extending in the axial direction of said rotor for allowing cooling air to pass and flow toward said large-diameter fin positioned closely to said rotor.

4. The alternator for an automotive vehicle in accordance with claim 3, wherein said through holes are provided in the vicinity of bottom portions of said ribs.

5. The alternator for an automotive vehicle in accordance with claim 1, wherein an axial thickness of said receiving hole of said small-diameter fin is greater than that of another part of said small-diameter fin.

* * * * *